US011952051B2

(12) United States Patent
Monnet et al.

(10) Patent No.: US 11,952,051 B2
(45) Date of Patent: Apr. 9, 2024

(54) GUIDE BEARING OF A RACK OF A STEERING SYSTEM

(71) Applicant: JTEKT EUROPE, Irigny (FR)

(72) Inventors: Roch Monnet, Brindas (FR); Arnaud Latreille, Pierre Benite (FR); Yannick Vigne, Lyons (FR)

(73) Assignee: JTEKT EUROPE, Irigny (FR)

( * ) Notice: Subject to any disclaimer, the term of this patent is extended or adjusted under 35 U.S.C. 154(b) by 0 days.

(21) Appl. No.: 17/837,512

(22) Filed: Jun. 10, 2022

(65) Prior Publication Data

US 2022/0396303 A1    Dec. 15, 2022

(30) Foreign Application Priority Data

Jun. 14, 2021    (FR) ..................................... 21/06241

(51) Int. Cl.
*B62D 3/12*    (2006.01)
*F16H 55/28*    (2006.01)

(52) U.S. Cl.
CPC ........... *B62D 3/123* (2013.01); *F16H 55/283* (2013.01)

(58) Field of Classification Search
CPC . B62D 3/123; F16H 55/283; F16H 2055/281; F16H 19/04
See application file for complete search history.

(56) References Cited

U.S. PATENT DOCUMENTS

| 719,562 | A | * | 2/1903 | Brush | B62D 3/02 384/255 |
| 4,369,669 | A | * | 1/1983 | Allen | F16H 19/04 74/498 |
| 5,778,731 | A | * | 7/1998 | Heep | F16C 29/02 384/255 |

(Continued)

FOREIGN PATENT DOCUMENTS

| DE | 10 2017 102 420 A1 | 8/2018 |
| DE | 10 2017 210 460 A1 | 12/2018 |

(Continued)

OTHER PUBLICATIONS

Feb. 25, 2022 Search Report issued in French Patent Application No. 2106241.

(Continued)

*Primary Examiner* — Jake Cook (74) *Attorney, Agent, or Firm* — Oliff PLC (57) ABSTRACT

A rack guide bearing for meshing a pinion and vehicle steering system rack, the guide bearing including a wall, a first portion is tubular and defines an axis and internal channel around the axis opening at the guide bearing first end, and opening onto a second portion of the wall opposite the first end, an internal channel section transverse to the axis and inserts the rack into the channel according to the rack axis parallel to the guide bearing axis, the guide bearing including an internal channel inner surface of the guide bearing wall's first portion and an inner surface of the guide bearing wall's second portion, the inner surfaces are in (Continued)

slipping contact with a slipping surface of the rack opposite to a toothing of the rack, when the rack is inserted inside the first portion of the wall's internal channel according to the axis of the rack.

11 Claims, 7 Drawing Sheets

(56) References Cited

U.S. PATENT DOCUMENTS

| | | | | |
|---|---|---|---|---|
| 6,247,375 B1* | 6/2001 | Gierc | .................... | F16C 29/123 |
| | | | | 74/422 |
| 7,665,747 B2* | 2/2010 | Arlt | ......................... | F16C 33/20 |
| | | | | 384/296 |
| 2018/0297628 A1* | 10/2018 | Bando | ...................... | B62D 3/12 |

FOREIGN PATENT DOCUMENTS

| | | | |
|---|---|---|---|
| EP | 3 388 309 A1 | 10/2018 | |
| FR | 2924083 A1 * | 5/2009 | ............... B62D 3/12 |
| WO | 2019/029865 A1 | 2/2019 | |

OTHER PUBLICATIONS

Translation of Feb. 25, 2022 Written Opinion issued in French Patent Application No. 2106241.

* cited by examiner

GUIDE BEARING OF A RACK OF A STEERING SYSTEM

The present invention concerns the technical field of rack steering system of motor vehicles, and in particular mounting and guidance of the rack in a steering system.

It is known to use a "pusher line", sometimes called "pusher", to keep the rack in meshing contact with the steering pinion while compensating for the toothing defects and wears. The pusher elastically acts on the back of the rack in the region of the pinion to strongly press the toothing of the rack against the pinion. Thanks to the pusher, the meshing defects of the rack with the pinion are compensated, and this pusher also ensures guidance of the rack, while controlling the sliding force of the rack in the steering casing.

In its most common implementation, the pusher device comprises a pusher, which is a part mounted movable in translation along a direction substantially perpendicular to the longitudinal axis of the rack, in a cylindrical machined casing portion, this part being urged towards the back of the rack by elastic means, so as to press on the back of the rack by a terminal portion with a suitable shape. The elastic means may consist of a helical spring alone or of a metallic or elastomeric elastic washer, or of a combination of such elastic members. These elastic means bear beneath a setting screw made of metal, which enables setting of the recoil of the pusher (new condition operating clearance) and which constitutes the end-of-travel stop of the pusher.

One of the drawbacks of such a solution, is that the mechanical set formed by the rack, by the pinion and by the pusher device is subject to impacts, which generate noises, which occurs in particular when rolling on a paved road or when reversing steering. The impacts that are considered herein, sources of noises, occur:
- in the contact area of the toothings of the rack and of the pinion,
- at the points of contact of the pusher itself with the inner wall of the corresponding cylindrical casing portion, in case of toggling of the pusher, and
- in the contact area between the pusher itself and the setting screw, in case of recoil of the pusher up to abutment against said screw.

Usually, additional parts that will be called anti-noise ring should be added to suppress or limit these noise or vibration phenomena.

Another drawback of this pusher device is that it is expensive with regards to the number of needed parts and of machining operations, but also with regards to its set-up and the necessary setting on an assembly line.

Another drawback is that the application of a considerable force on the rack to press it on the pinion generates considerable frictions which could affect the drive feel of the driver. For example, a sticking feel or a too considerable filtering of the information from the road.

Another drawback is the bulk of a pusher line. Indeed, the latter being structurally installed perpendicularly to the pinion, there are often problems of contacts or proximities with other elements of the engine compartment, in particular with the cradle of the vehicle on which it might be necessary to provide for arrangements with particular shapes.

Hence, the invention aims at providing a solution to all or part of these problems.

To this end, the present invention concerns a guide bearing of a rack for meshing a pinion and the rack of a steering system of a vehicle, the guide bearing comprising a wall, a first portion of the wall being tubular and defining an axis of the guide bearing and an internal channel around the axis, said internal channel opening at a first end of the guide bearing, and opening onto a second portion of the wall opposite to the first end in the axis of the guide bearing, the internal channel having a section transverse to the axis, the section being configured to enable the insertion of the rack inside the internal channel according to an axis of the rack parallel to the axis of the guide bearing, the guide bearing comprising an inner surface of the internal channel of the first portion of the wall of the guide bearing and an inner surface of the second portion of the wall of the guide bearing, said inner surfaces being arranged so as to be in slipping contact with a slipping surface of the rack opposite to a toothing of the rack, when the rack is inserted inside the internal channel of the first portion of the wall according to the axis of the rack, the guide bearing further comprising at least one damping means placed, at least partially, around the guide bearing according to a plane transverse to the axis of the guide bearing, the at least one damping means being arranged on the second portion of the wall, the pinion being positioned opposite the inner surface of the second portion of the wall of the guide bearing so as to mesh the toothing of the rack.

According to these arrangements, the guide bearing is configured to ensure guidance of the rack and holding of the rack against the pinion positioned opposite the inner surface of the second portion of the wall of the guide bearing so as to mesh the toothing of the rack. In particular, the rack is pressed against the pinion, and the wear that might appear following the operation of the mechanism is compensated by the one or more damper element(s) of the at least one damping means, such compensation being all the more efficient as the at least one damping element is located on the portion of the wall which is opposite to the pinion.

According to one embodiment, the invention comprises one or more of the following features, alone or in a technically-feasible combination.

According to one embodiment, the axis of the guide bearing and the axis of the rack are transverse with respect to an axis of the pinion when the pinion is positioned so as to mesh the toothing of the rack.

According to one embodiment, the axis of the guide bearing and a direction of extension of the guide bearing are substantially parallel; in other words, they form an angle comprised between −10 and +10 degrees, in particular comprised between −5 and +5 degrees, more particularly comprised between −2 and +2 degrees.

According to one embodiment, the arrangement of the inner surfaces of the internal channel of the first portion of the wall of the guide bearing and of the second portion of the wall of the guide bearing comprises at least one bearing surface positioned on the inner surface of the internal channel of the first portion of the wall of the guide bearing and/or on the inner surface of the second portion of the wall of the guide bearing, the at least one bearing surface being configured to be in slipping contact with the surface of the rack opposite to a toothing of the rack.

According to these arrangements, the bearing surface(s) of the guide bearing reduce the extent of the contact surfaces, and thus reduce frictions, during sliding of the rack.

According to one embodiment, the at least one bearing surface is created by an extra-thickness on the portion of the internal surface of the wall of the guide bearing.

According to one embodiment, the extra-thickness has a curvature according to a section in a plane transverse to the axis of the bearing, a curvature center of the curvature being eccentric with respect to the axis of the guide bearing.

According to one embodiment, the arrangement of the inner surface of the internal channel of the first portion of the wall of the guide bearing and/or of the inner surface of the second portion of the wall of the guide bearing comprises at least one groove positioned on the inner surface of the internal channel of the first portion of the wall of the guide bearing and/or on the inner surface of the second portion of the wall of the guide bearing, the at least one groove being configured to receive a lubricant.

According to one embodiment, the guide bearing is made of a self-lubricating plastic material.

According to these arrangements, the contact will be more slippery between the slipping surface of the rack and the inner surface of the internal channel of the first portion of the wall of the guide bearing and/or the inner surface of the second portion of the wall of the guide bearing.

According to one embodiment, the second portion of the wall is also tubular around the axis of the guide bearing, the second portion of the wall defining another internal channel extending the internal channel defined by the first portion of the wall, the other internal channel opening at a second end of the guide bearing, the second end being opposite to the first end of the guide bearing in the axis of the guide bearing, the second portion of the wall being crossed by an external opening leading into the other internal channel, the external opening being arranged on the second portion of the wall opposite to the inner surface of the second portion of the wall with respect to the axis of the guide bearing, the external opening being configured to accommodate the pinion.

According to one embodiment, the guide bearing further comprises at least one damping means placed, at least partially, around the guide bearing according to a plane transverse to the axis of the guide bearing.

According to these arrangements, the operating clearances or wears, located between the guide bearing and a steering casing in which the guide bearing is fixedly mounted, will be compensated by the damping means whose stiffness will be adjusted during the set-up of the guide bearing so that the rack is always properly pressed against the pinion.

According to one embodiment, said at least one damping means comprises at least one annular shaped damping element placed around the guide bearing in a plane transverse to the axis of the guide bearing.

According to one embodiment, said at least one damping means comprises a first damper element in a first transverse plane located at one end of the guide bearing, and a second damper element in a second transverse plane located at another end of the guide bearing.

According to one embodiment, the at least one damping means comprises a damper element in a first transverse plane located at one end of the guide bearing, and/or in a second transverse plane located at another end of the guide bearing.

According to one embodiment, the damper element is a seal having a closed contour.

According to one embodiment, the seal is an O-ring gasket.

According to one embodiment, the seal is arranged so as to run in a double groove arranged on the second portion of the wall.

According to one embodiment, the at least one damping means comprises an appendix made of a damper material, said appendix being affixed by overmolding, gluing, or clipping, over all or part of the outer surface of the wall of the guide bearing.

According to one embodiment, the damper element is an O-ring gasket, mounted in an annular groove dug over a perimeter of the guide bearing.

According to one embodiment, the damper element is an O-ring gasket arranged so as to run in a double groove arranged on the wall of the guide bearing, for example on the second portion of the wall.

According to one embodiment, said at least one damping means comprises an overmolding with a damper material, for example a polymer foam, said overmolding being affixed over all or part of the outer surface of the wall of the guide bearing.

According to these arrangements, when the rack is inserted inside the internal channel of the first portion of the wall according to the axis of the rack, the rack is pressed against the pinion, and the wear that might appear following the operation of the mechanism is compensated by the damper element(s) of the at least one damping means.

According to one embodiment, the guide bearing is configured to be fixedly mounted with respect to a steering casing of the steering system, the guide bearing further comprising an angular index element, said index element being configured to cooperate with a complementary element of the steering casing so as to define an angular position of the guide bearing around the axis of the guide bearing.

According to one embodiment, the angular index element is a lug projecting on an outer surface of the wall of the guide bearing.

According to one embodiment, the guide bearing comprises a clipping element positioned on an outer surface of the wall, the clipping element being configured to cooperate with another complementary element of the steering casing to keep the guide bearing inside the steering casing.

According to one embodiment, the other complementary element of the steering casing is a groove machined in the steering casing, or a ring fitted into the steering casing, or a circlip in the steering casing.

According to one embodiment, the guide bearing further comprises at least one slot opening onto the internal channel of the guide bearing, said slot crossing the wall according to a direction of extension of the guide bearing, said slot being configured to enable an elastic deformation of the wall by the effect of a pressure exerted on an outer surface of the wall, the elastic deformation resulting in a narrowing of a section of the wall in a plane transverse to the axis of the guide bearing.

According to these arrangements, an insertion of the guide bearing into the steering casing is facilitated.

According to one embodiment, the clipping element positioned on the outer surface of the wall, and configured to cooperate with a complementary element of the steering casing to hold the guide bearing clipped in the steering casing by a biasing effect of the elastic deformation obtained by the pressure exerted on the outer surface of the wall.

According to these arrangements, the guide bearing is clipped in the steering casing.

According to one embodiment, the guide bearing comprises at least one groove formed on an outer surface of the wall, to soften the tubular wall.

According to one embodiment, the at least one groove is a slot opening onto the internal channel and/or the other internal channel of the guide bearing.

According to these arrangements, the groove(s) which consist of slots confer softness on the structure of the guide bearing, which softness allows attenuating the wear-related clearances of the guide bearing.

According to one embodiment, the at least one groove is formed between two extra-thicknesses of the outer surface of the at least one portion of the wall.

According to these arrangements, it is possible to control at least one damping direction by blocking some degrees of freedom of deformations of the guide bearing.

According to one embodiment, the guide bearing further comprises at least one arrangement of a central portion of the wall of the guide bearing, said central portion being arranged on a portion of the wall that corresponds to the inner surface of the second portion of the wall of the guide bearing.

According to these arrangements, the arrangements are configured to create a softer central portion opposite the pinion when the pinion is accommodated into the external opening.

According to one embodiment, the at least one arrangement comprises a slot around the central portion of the wall.

According to one embodiment, the at least one arrangement comprises a determined thickness of the central portion of the wall.

According to one embodiment, the guide bearing further comprises a stroke limiter, the stroke limiter being configured to limit the stroke of the rack when the rack is inserted into the guide bearing.

According to one embodiment, the stroke limiter is integrated to the first end of the guide bearing.

According to these arrangements, the stroke limiter avoids a metallic contact of an axial ball-joint case with the steering casing.

According to one embodiment, the first portion of the wall and the second portion of the wall are separate and configured to be assembled.

According to one embodiment, the first portion and the second portion are configured to be assembled by clipping of the first portion with the second portion, or by ultrasonic welding between the first portion and the second portion.

According to one embodiment, the first portion and the second portion are assembled by placing the first portion in a recess of a cavity of an injection mold and by overmolding the second portion by injection in the injection mold.

According to one embodiment, the first portion and the second portion are made of different plastic materials, so that a wear-resistance of each of the portions is different from each other, the wear-resistance of each portion being adapted to the operating stresses of each portion.

For better understanding thereof, one embodiment and/or implementation of the invention is described with reference to the appended drawings representing, as a non-limiting example, an embodiment or implementation respectively of a device and/or a method according to the invention. Elements bearing the same references in the drawings refer to similar elements or to elements whose functions are similar.

An embodiment of the guide bearing 1 according to the invention will now be described with reference to FIG. 1.

Figure 1:
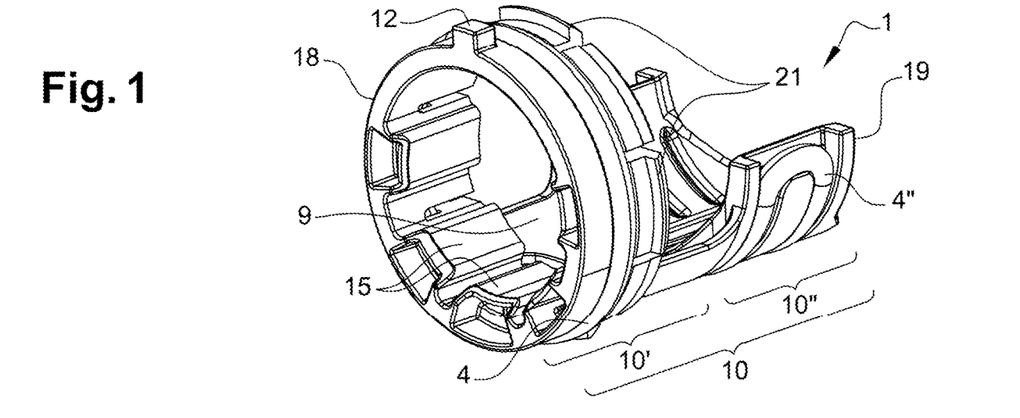
FIG. 1 is a perspective view of a guide bearing according to an embodiment of the invention.
Figure 16:
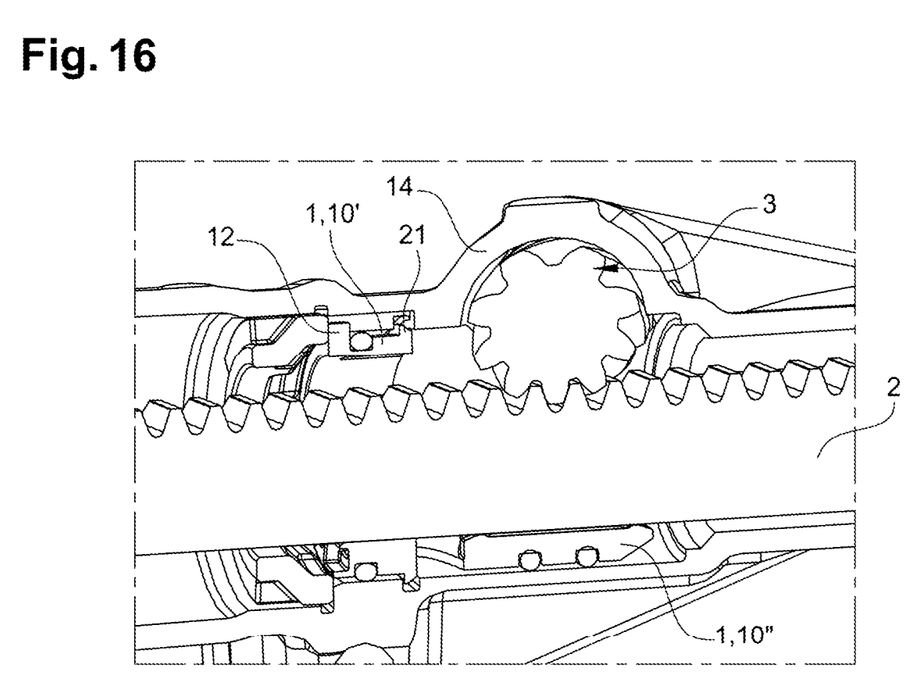
FIG. 16 is a sectional view of a guide bearing according to the embodiment of FIG. 1 mounted in the steering casing.

The guide bearing 1 of FIG. 1 is intended to be mounted, as represented in FIG. 16, in a casing 14 of a steering system of a vehicle, and to receive a rack 2 for meshing a pinion 3 and the toothing of said rack 2.

The guide bearing 1 comprises a wall 10, with a first portion 10' of the wall 10 and a second portion 10" of the wall 10.

The first portion is tubular and defines an axis of the guide bearing 1 and an internal channel 9 around the axis, said internal channel 9 opening at a first end 18 of the guide bearing 1; said internal channel 9 opens onto the second portion 10" of the wall 10 opposite to the first end 18 in the axis of the guide bearing 1. The internal channel 9 has a section transverse to the axis of the guide bearing 1, the section being configured to enable the insertion of the rack 2 inside the internal channel 9 according to an axis of the rack 2 parallel to the axis of the guide bearing 1. The guide bearing 1 comprises an inner surface of the internal channel 9 of the first portion 10' of the wall 10 and an inner surface of the second portion 10" of the wall 10, said inner surfaces being arranged so as to be in slipping contact with a slipping surface of the rack 2, said slipping surface being opposite to the toothing of the rack 2, when the rack is inserted inside the internal channel 9 of the first portion 10' of the wall 10 according to the axis of the rack 2.

Conventionally, we will call inner surface of the first portion 10', or of the second portion 10", the surface of the wall 10 that is arranged so as to receive, and to be in slipping contact with the so-called slipping surface of the rack 2.

Figure 3:
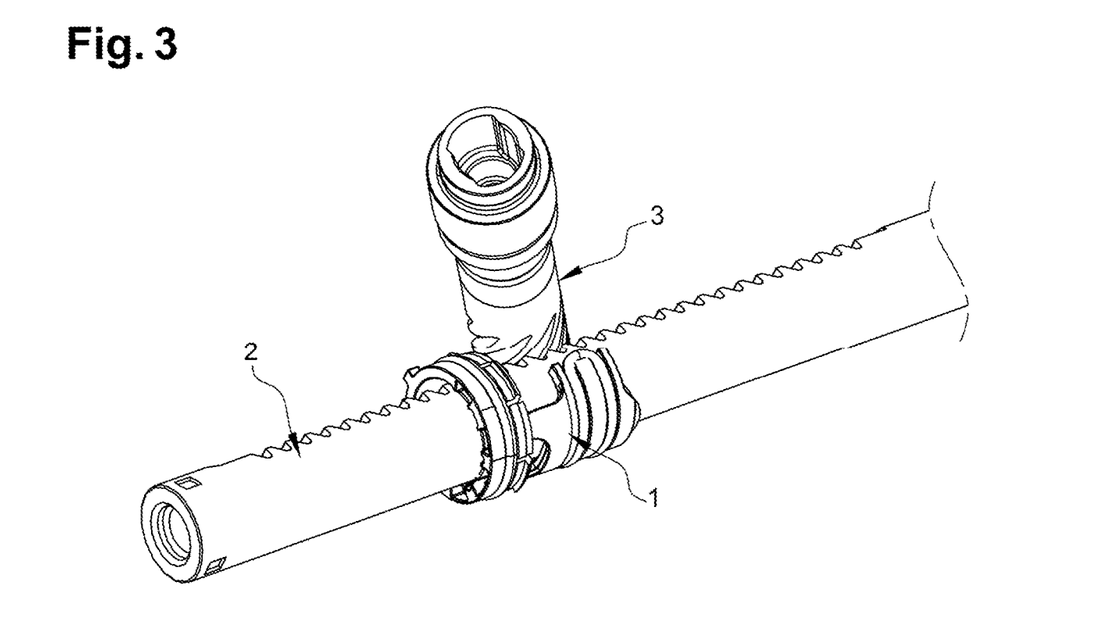
FIG. 3 is a perspective view of a guide bearing according to the embodiment of FIG. 1 mounted on the rack meshed with the pinion.

According to these arrangements, the guide bearing is configured to ensure guidance of the rack and holding of the rack against the pinion positioned opposite the inner surface of the second portion 10" of the wall 10 of the guide bearing 1 so as to mesh the toothing of the rack 2, as illustrated in FIGS. 3 and 16.

In particular, the axis of the guide bearing and the axis of the rack are transverse with respect to an axis of the pinion when the pinion is positioned so as to mesh the toothing of the rack.

According to one embodiment, the axis of the guide bearing and a direction of extension of the guide bearing are substantially parallel; in other words, they form an angle comprised between −10 and +10 degrees, in particular comprised between −5 and +5 degrees, more particularly comprised between −2 and +2 degrees.

In particular, the arrangement of the inner surfaces of the internal channel 9 of the first portion 10' of the wall 10 of the guide bearing 1 and of the second portion 10" of the wall 10 of the guide bearing 1 comprises at least one bearing surface 15, 17 positioned on the inner surface of the internal channel 9 of the first portion 10' of the wall 10 of the guide bearing 1 and/or on the inner surface of the second portion 10" of the wall 10 of the guide bearing 1, at least one bearing surface being configured to be in slipping contact with the surface of the rack 2 opposite to a toothing of the rack 2.

According to these arrangements, the bearing surface(s) 15, 17 of the guide bearing 1 reduce the extent of the contact surfaces, and thus reduce frictions, during sliding of the rack.

More particularly, the at least one bearing surface 15, 17 is created by an extra-thickness on the portion of the internal surface of the wall of the guide bearing 1.

Even more particularly, the extra-thickness 15, 17 has a curvature according to a section in a plane transverse to the axis of the guide bearing 1, a center of curvature being eccentric with respect to the axis of the guide bearing 1.

According to another embodiment, the arrangement of the inner surface of the internal channel 9 of the first portion 10' of the wall 10 of the guide bearing 1 and of the inner surface of the second portion 10" of the wall 10 of the guide bearing 1 comprises at least one groove 20 positioned on the inner surface of the internal channel 9 of the first portion 10' of the wall 10 and/or on the inner surface of the second portion 10" of the wall 10, at least one groove 20 being configured to receive a lubricant; the lubricant is for example a grease applied over the slipping surface of the rack.

Advantageously, the guide bearing may also be made of a self-lubricating plastic material.

According to these arrangements, the contact will be even more slippery between the slipping surface of the rack and the inner surface of the internal channel 9 of the first portion 10' of the wall 10 and/or the inner surface of the second portion 10" of the wall 10.

Figure 4:
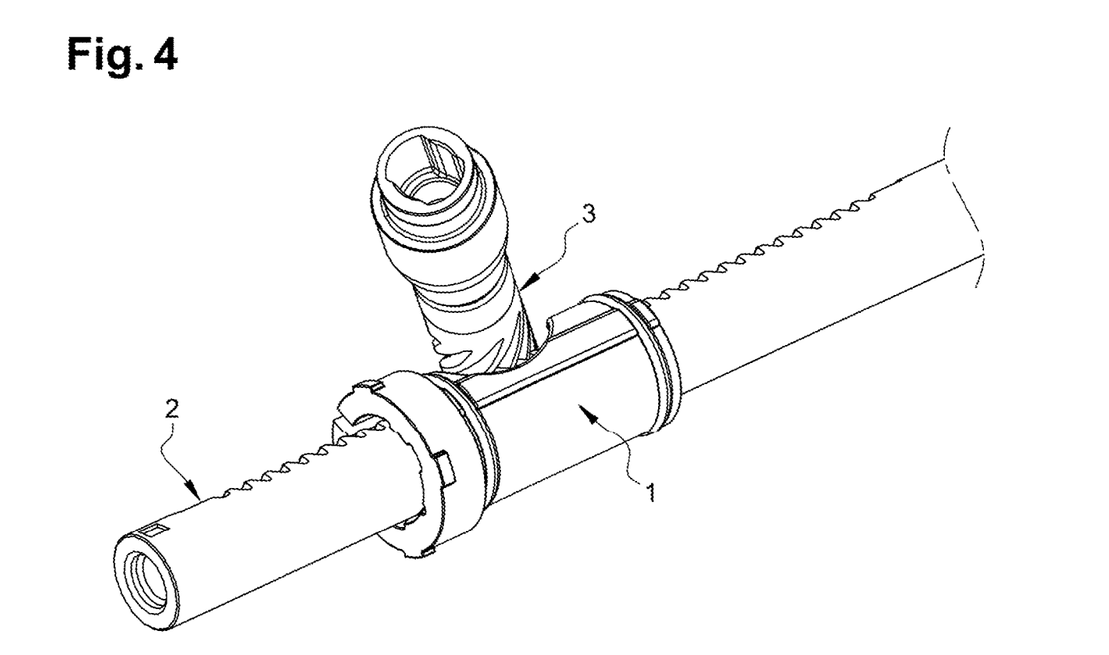
FIG. 4 is a perspective view of the guide bearing according to another embodiment mounted on the rack meshing with the pinion.
Figure 5:
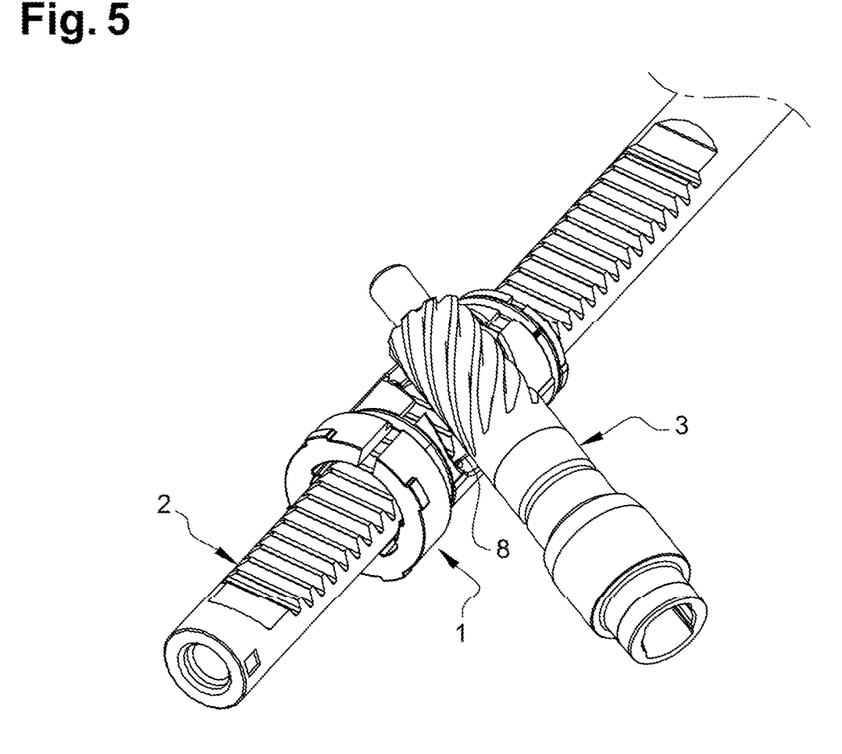
FIG. 5 is another perspective view of a guide bearing according to the embodiment of FIG. 4 mounted on the rack meshing with the pinion.
Figure 6:
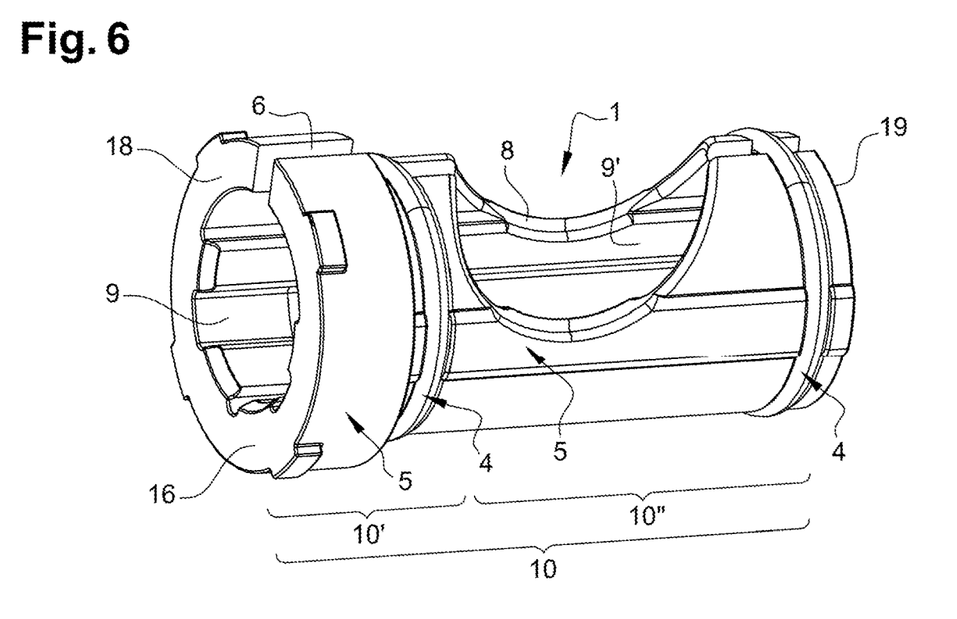
FIG. 6 is a perspective view of a guide bearing according to the embodiment of FIGS. 4 and 5.

According to a second embodiment of the guide bearing 1, represented more particularly in FIGS. 4 to 15 according to different variants; in particular with reference to FIG. 6, the guide bearing 1 comprises a second portion 10" of the wall 10 which is also tubular around the axis of the guide bearing 1, the second portion 10" of the wall 10 defining another internal channel 9' extending the internal channel 9 defined by the first portion 10' of the wall 10, the other internal channel 9' opening at a second end 19 of the guide bearing 1, the second end 19 being opposite to the first end 18 of the guide bearing 1 in the axis of the guide bearing 1; the second portion 10" of the wall 10 is crossed by an external opening 8 leading into the other internal channel 9', the external opening 8 being arranged on the second portion 10" of the wall 10 opposite to the inner surface of the second portion 10" of the wall 10 with respect to the axis of the guide bearing 1; the external opening 8 is configured to accommodate the pinion 3 as illustrated in particular in FIGS. 4 and 5.

In particular, it arises, in particular in FIG. 5, that the external opening 8 leads into the other internal channel 9' of the guide bearing 1 on the side of the toothing of the rack 2, so that the toothing of the pinion 3 meshes with the toothing of the rack 2 when the pinion 3 is received in the external opening 8.

To ensure a proper holding of the rack 2 inserted into the guide bearing 1 in contact with the pinion 3, when the guide bearing is mounted in the steering casing 14, at least one damping means 4, 4', 4" is provided. Said damping means is placed at least partially around the guide bearing 1, according to a plane transverse to the axis of the guide bearing 1.

According to these arrangements, the operating clearances or wears located between the guide bearing and a steering casing in which the guide bearing is fixedly mounted, will be compensated by the damping means whose stiffness will be adjusted during the set-up of the guide bearing so that the rack is always properly pressed against the pinion.

According to one embodiment, said damping means comprises at least one annular shaped damping element 4, placed around the guide bearing in a plane transverse to the axis of the guide bearing.

In particular, in a manner adapted to the second embodiment of the guide bearing illustrated in FIG. 6, said damping means comprises a first damper element 4 in a first transverse plane located at a first end 18 of the guide bearing 1, and a second damper element 4 in a second transverse plane located at the second end 19 of the guide bearing.

As example, the damping element 4 may be an O-ring gasket, mounted in an annular groove dug over a perimeter of the guide bearing.

According to one embodiment, adapted to the first embodiment illustrated in particular in FIG. 1, the damper element 4" is an O-ring gasket arranged so as to run in a double groove arranged on the wall 10 of the guide bearing 1, in particular on the second portion 10" of the wall 10.

Figure 8:
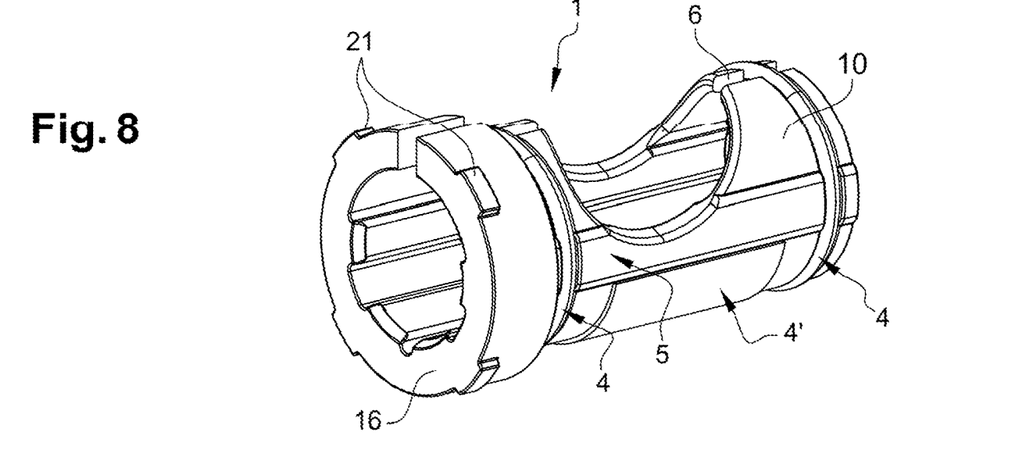
FIG. 8 is a perspective view of a guide bearing according to another embodiment of the invention.
Figure 9:
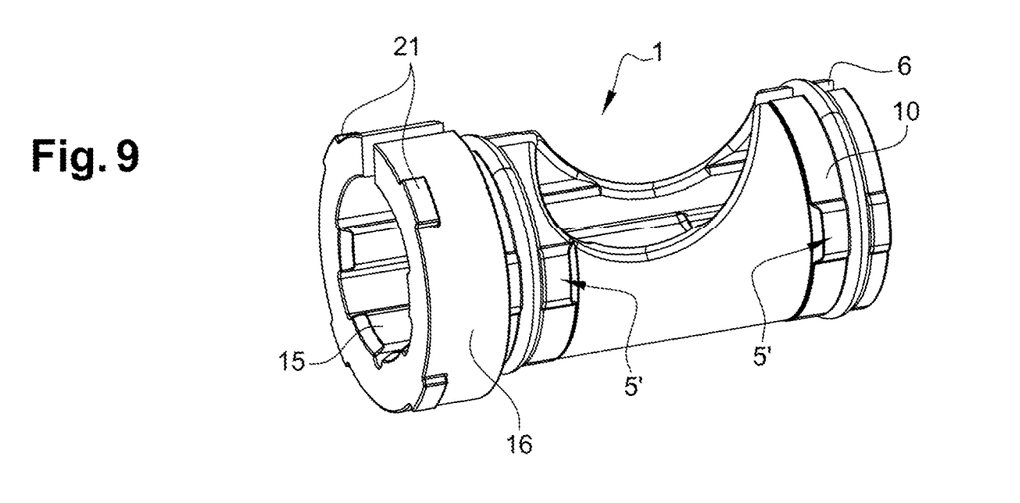
FIG. 9 is a perspective view of a guide bearing according to another embodiment of the invention.
Figure 10:
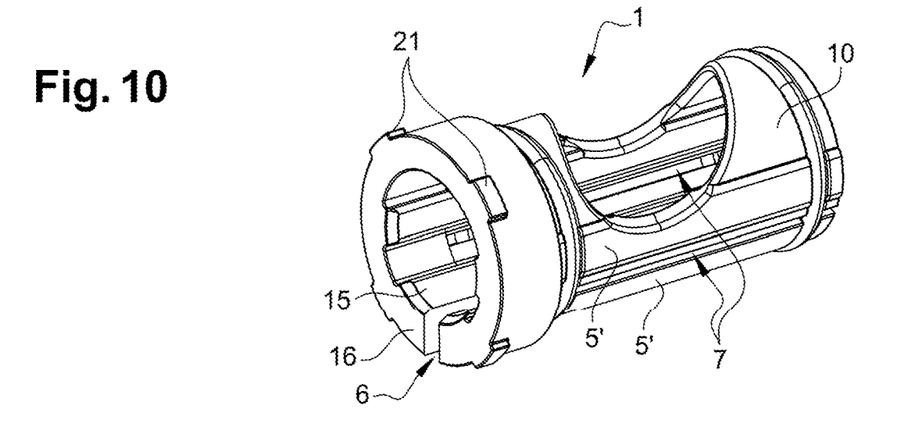
FIG. 10 is a perspective view of a guide bearing according to another embodiment of the invention.

According to one embodiment, said damping means comprises an appendix 4' made of a damper material, for example a polymer foam, said appendix being affixed by overmolding, gluing, or clipping, over all or part of the outer surface of the wall 10 of the guide bearing 1, as illustrated as an embodiment in FIG. 8.

According to these arrangements, when the rack is inserted inside the internal channel 9 of the first portion 10' of the wall 10 according to the axis of the rack 2, the rack is held pressed against the pinion 3, and the wear that might appear following the operation of the mechanism is compensated by the damper element(s) of the at least one damping means 4, 4', 4".

To define an angular position of the guide bearing 1 around the axis of the guide bearing 1, with respect to the steering casing 14 of the steering system, the guide bearing 1 may comprise an angular index element 12, said index element 12 being configured to cooperate with a complementary element 13 of the steering casing 14.

Figure 13:
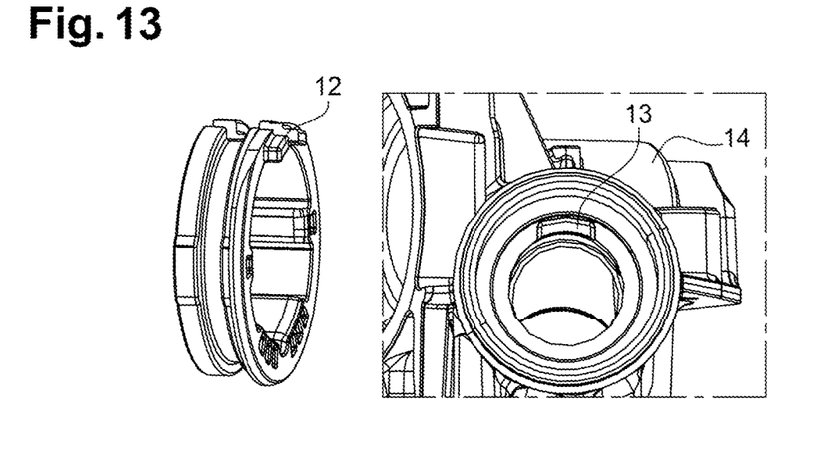
FIG. 13 is a perspective view of a means for achieving an angular orientation, said means being herein used and represented on a known anti-noise ring.

For example, the angular index element 12 is a lug projecting on an outer surface of the wall 10 of the guide bearing, as illustrated in FIGS. 1, 16 and 13 corresponding respectively to two different embodiments of the guide bearing according to the invention.

To ensure a proper holding of the guide bearing 1 in the casing 14, a clipping element 21 may be positioned on an outer surface of the wall 10, the clipping element 21 being configured to cooperate with another complementary element of the steering casing 14, for example a groove machined in the steering casing, to hold the guide bearing inside the steering casing 14. This embodiment is illustrated in particular in FIGS. 1 and 16.

According to another embodiment illustrated in particular in FIGS. 6, and 8 to 12, the guide bearing 1 comprises a slot 6 opening onto the internal channel 9 of the guide bearing 1, said slot 6 crossing the wall 10 according to the direction of extension of the guide bearing 1, said slot 6 being configured to enable an elastic deformation of the wall 10 by the effect of a pressure exerted on an outer surface of the wall 10, the elastic deformation resulting in a narrowing of a section of the wall in a plane transverse to the axis of the guide bearing 1.

According to these arrangements, an insertion of the guide bearing into the steering casing is facilitated.

Furthermore, the clipping element(s) 21 positioned on the outer surface of the wall 10, and configured to cooperate with a complementary element of the steering casing, contribute to holding the guide bearing 1, clipped in the steering casing 14, by a biasing effect of the elastic deformation obtained by the pressure exerted on the outer surface of the wall 10.

According to these arrangements, the guide bearing is clipped in the steering casing.

According to one embodiment, the guide bearing comprises at least one groove 7 formed on the outer surface of the wall, to soften the tubular wall, in particular the second portion 10" of the wall 10.

According to one embodiment, the at least one groove 7 is a slot opening onto the internal channel 9 and/or onto the other internal channel 9' of the guide bearing.

According to these arrangements, the groove(s) 7 which consist of slots confer softness on the structure of the guide bearing, which softness allows attenuating the wear-related clearances of the guide bearing.

According to one embodiment, the at least one groove 7 is formed between two extra-thicknesses 5' of the outer surface of the at least one portion 10', 10" of the wall 10.

According to these arrangements, it is possible to control at least one damping direction by blocking some degrees of freedom of deformations of the guide bearing.

Figure 14:
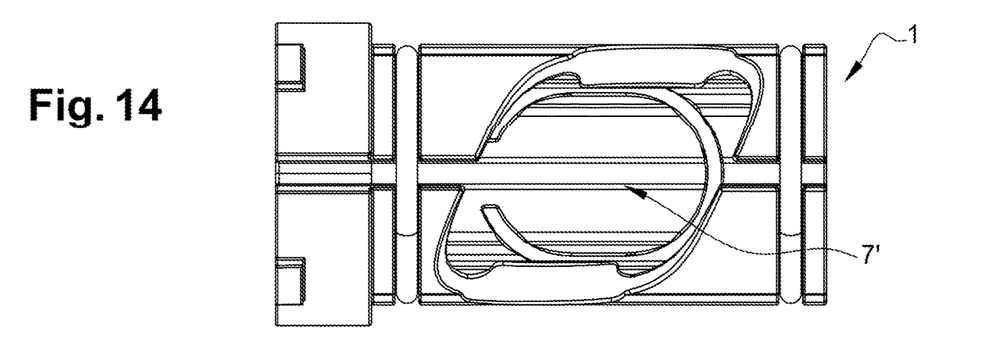
FIG. 14 is a perspective view of a guide bearing according to an embodiment of the invention.
Figure 15:
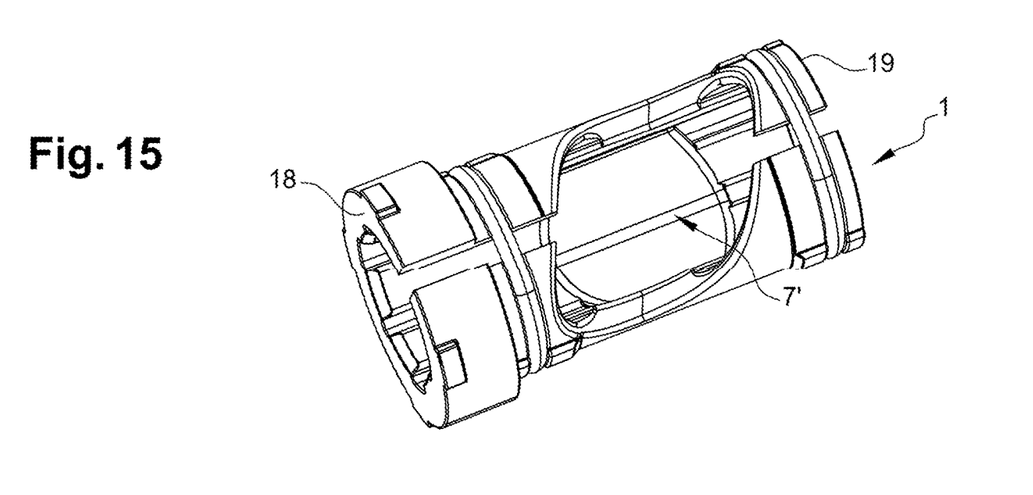
FIG. 15 is a perspective view of a guide bearing according to an embodiment of the invention, corresponding to the embodiment represented according to another angle in FIG. 12.

Furthermore, to create a central portion of the guide bearing 1 that is softer opposite the pinion 3, when the pinion 3 is meshing with the toothing of the rack 2, the guide bearing 1 comprises, according to embodiments illustrated more particularly in FIGS. 14 and 15, at least one arrangement 7' of the central portion of the wall 10 of the guide bearing 1; said central portion is arranged on a portion of the wall 10 which corresponds to the inner surface of the second portion 10" of the wall 10 of the guide bearing 1. Thus, this central portion is positioned opposite the pinion 3 meshing with the toothing of the rack 2.

According to an embodiment illustrated in FIG. 14, the arrangement comprises a slot around the central portion of the wall.

According to an embodiment illustrated in FIG. 15, the arrangement comprises a determined thickness of the central portion of the wall.

To avoid a metallic contact of an axial ball-joint case with the steering casing, the guide bearing 1 comprises, according to an embodiment illustrated in particular in FIGS. 6, 8 to 12, 14 and 15, a stroke limiter 16; the stroke limiter 16 is configured to limit the stroke of the rack 2 when the rack 2 is inserted into the guide bearing 1.

As example, the stroke limiter 16 is integrated to the first end 18 of the guide bearing 1.

Figure 7:
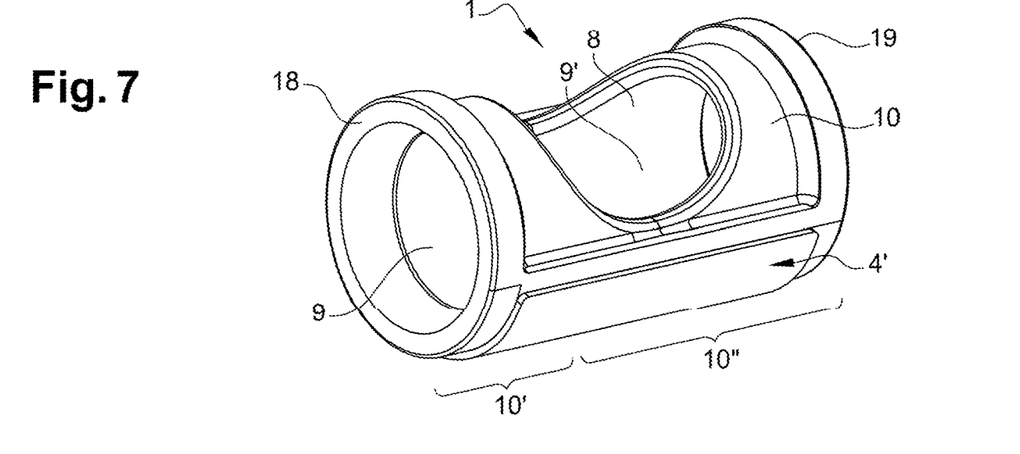
FIG. 7 is a perspective view of a guide bearing according to another embodiment of the invention.
Figure 11:
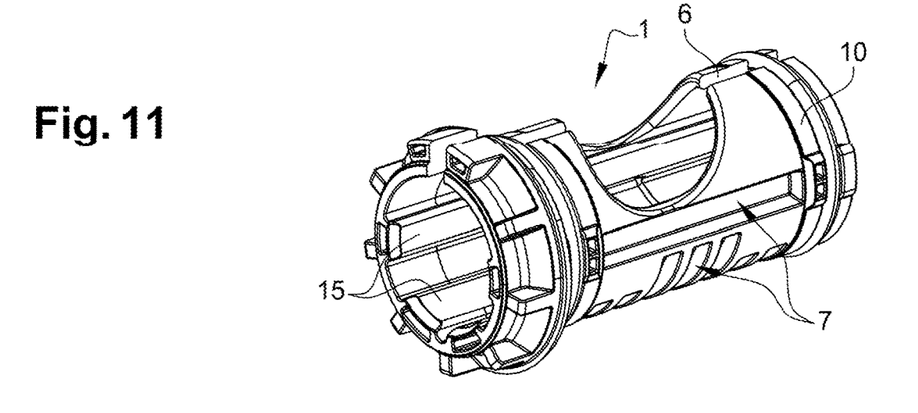
FIG. 11 is a perspective view of a guide bearing according to another embodiment of the invention.
Figure 12:
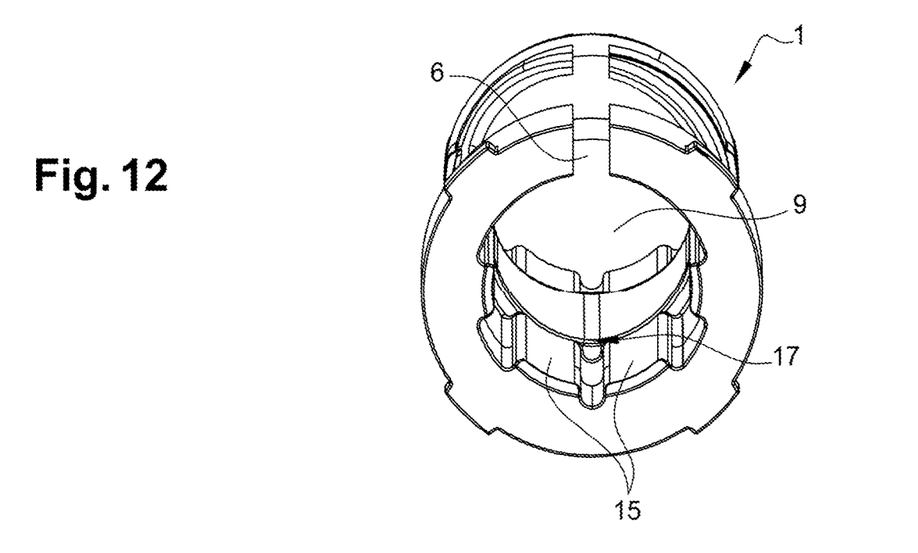
FIG. 12 is a perspective view of a guide bearing according to an embodiment of the invention.

In particular, FIGS. 1, 7 and 11 show an embodiment of the guide bearing 1 with no stroke limiter 16.

The first portion 10' of the wall 10 and the second portion 10" of the wall 10 of the guide bearing 1 according to the invention, may be separate and configured to be assembled.

Figure 2A:
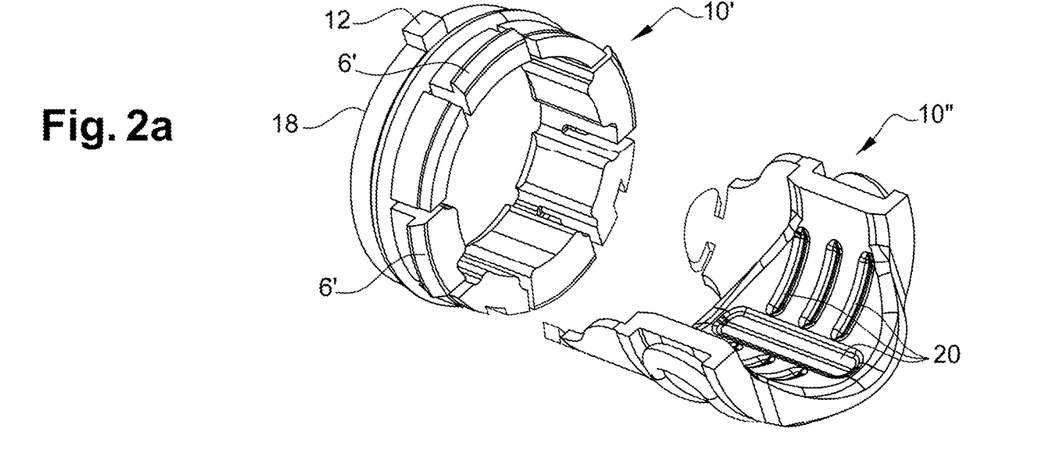
FIG. 2a is a perspective view of a guide bearing comprising two separable portions.
Figure 2B:
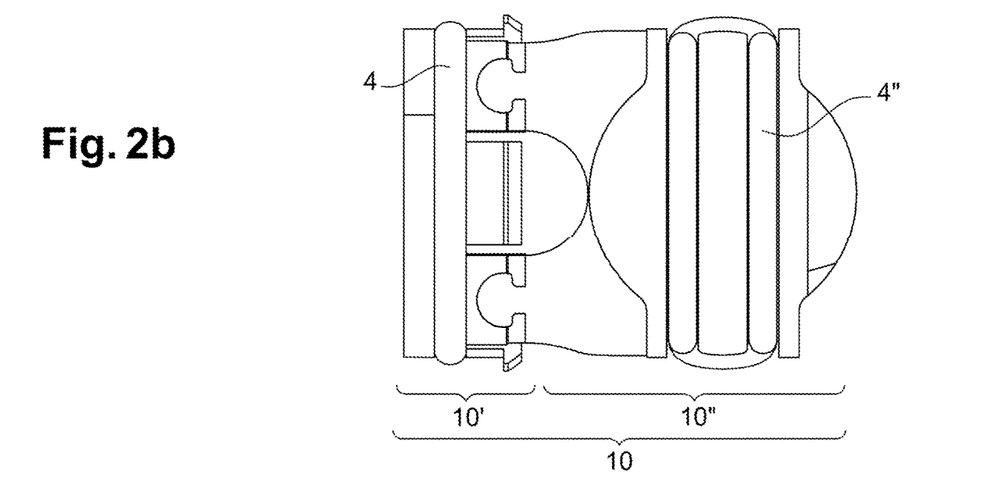
FIG. 2b is a perspective view of a guide bearing according to the embodiment of FIG. 2a, wherein the two separable portions are assembled so as to form the guide bearing according to the invention.

For example, as illustrated in FIGS. 2a and 2b, the first portion 10' and the second portion 10" of the wall 10 may be configured to be assembled by clipping of the first portion with the second portion.

According to another embodiment, the first portion 10' and the second portion 10" of the wall 10 may be configured to be assembled by ultrasonic welding between the first portion and the second portion.

According to another embodiment, the first portion and the second portion are assembled by placing the first portion in a recess of a cavity of an injection mold and by overmolding the second portion by injection in the injection mold.

In particular, the two portions of the bearing may be made of 2 different plastic materials; in particular, these materials may also include carbon fiber type reinforcements, so that each of the two portions could have a different wear resistance.

The invention claimed is:

1. A guide bearing of a rack for meshing a pinion and the rack of a steering system of a vehicle, the guide bearing comprising a wall, a first portion of the wall being tubular and defining an axis of the guide bearing and an internal channel around the axis, the internal channel opening at a first end of the guide bearing, and opening onto a second portion of the wall opposite to the first end in the axis of the guide bearing, the internal channel having a section transverse to the axis, the section being configured to enable the insertion of the rack inside the internal channel according to an axis of the rack parallel to the axis of the guide bearing, the guide bearing comprising an inner surface of the internal channel of the first portion of the wall of the guide bearing and an inner surface of the second portion of the wall of the guide bearing, the inner surfaces being arranged so as to be in slipping contact with a slipping surface of the rack opposite to a toothing of the rack, when the rack is inserted inside the internal channel of the first portion of the wall according to the axis of the rack, the guide bearing further comprising at least one damping means placed, at least partially, around the guide bearing according to a plane transverse to the axis of the guide bearing, the at least one damping means being arranged on the second portion of the wall, the pinion being positioned opposite the inner surface of the second portion of the wall of the guide bearing so as to mesh the toothing of the rack, wherein the at least one damping means comprises a seal having a closed contour, and the seal is arranged so as to run in a double groove arranged on the second portion of the wall.

2. The guide bearing according to claim 1, wherein the second portion of the wall is also tubular around the axis of the guide bearing, the second portion of the wall defining another internal channel extending the internal channel defined by the first portion of the wall, the other internal channel opening at a second end of the guide bearing, the second end being opposite to the first end of the guide bearing in the axis of the guide bearing, the second portion of the wall being crossed by an external opening leading into the other internal channel, the external opening being arranged on the second portion of the wall opposite the inner surface of the second portion of the wall with respect to the axis of the guide bearing, the external opening being configured to accommodate the pinion.

3. The guide bearing according to claim 1, wherein the at least one damping means comprises a damper element in a first transverse plane located at one end of the guide bearing, and/or in a second transverse plane located at another end of the guide bearing.

4. The guide bearing according to claim 1, wherein the seal is an O-ring gasket.

5. The guide bearing according to claim 1, wherein the at least one damping means comprises an appendix made of a damper material, the appendix being affixed by overmolding, gluing, or clipping, over all or part of the outer surface of the wall of the guide bearing.

6. The guide bearing according to claim 1, the guide bearing being configured to be fixedly mounted with respect to a steering casing of the steering system, the guide bearing further comprising an angular index element, the index element being configured to cooperate with a complementary element of the steering casing so as to define an angular position of the guide bearing around the axis of the guide bearing.

7. The guide bearing according to claim 1, comprising a clipping element positioned on an outer surface of the wall, the clipping element being configured to cooperate with a complementary element of a steering casing to keep the guide bearing inside the steering casing.

8. The guide bearing according to claim 2, further comprising at least one slot opening onto the internal channel of the guide bearing, the slot crossing the wall according to a direction of extension of the guide bearing, the slot being configured to enable an elastic deformation of the wall by the effect of a pressure exerted on an outer surface of the wall, the elastic deformation resulting in a narrowing of a section of the wall in a plane transverse to the axis of the guide bearing.

9. The guide bearing according to claim 1, further comprising at least one central portion of the wall being arranged on a portion of the wall that corresponds to the inner surface of the second portion of the wall of the guide bearing.

10. The guide bearing according to claim 1, further comprising a stroke limiter, the stroke limiter being configured to limit the stroke of the rack when the rack is inserted into the guide bearing.

11. The guide bearing according to claim 1, wherein the first portion of the wall and the second portion of the wall are separate and configured to be assembled.

\* \* \* \* \*